Patented Jan. 2, 1951

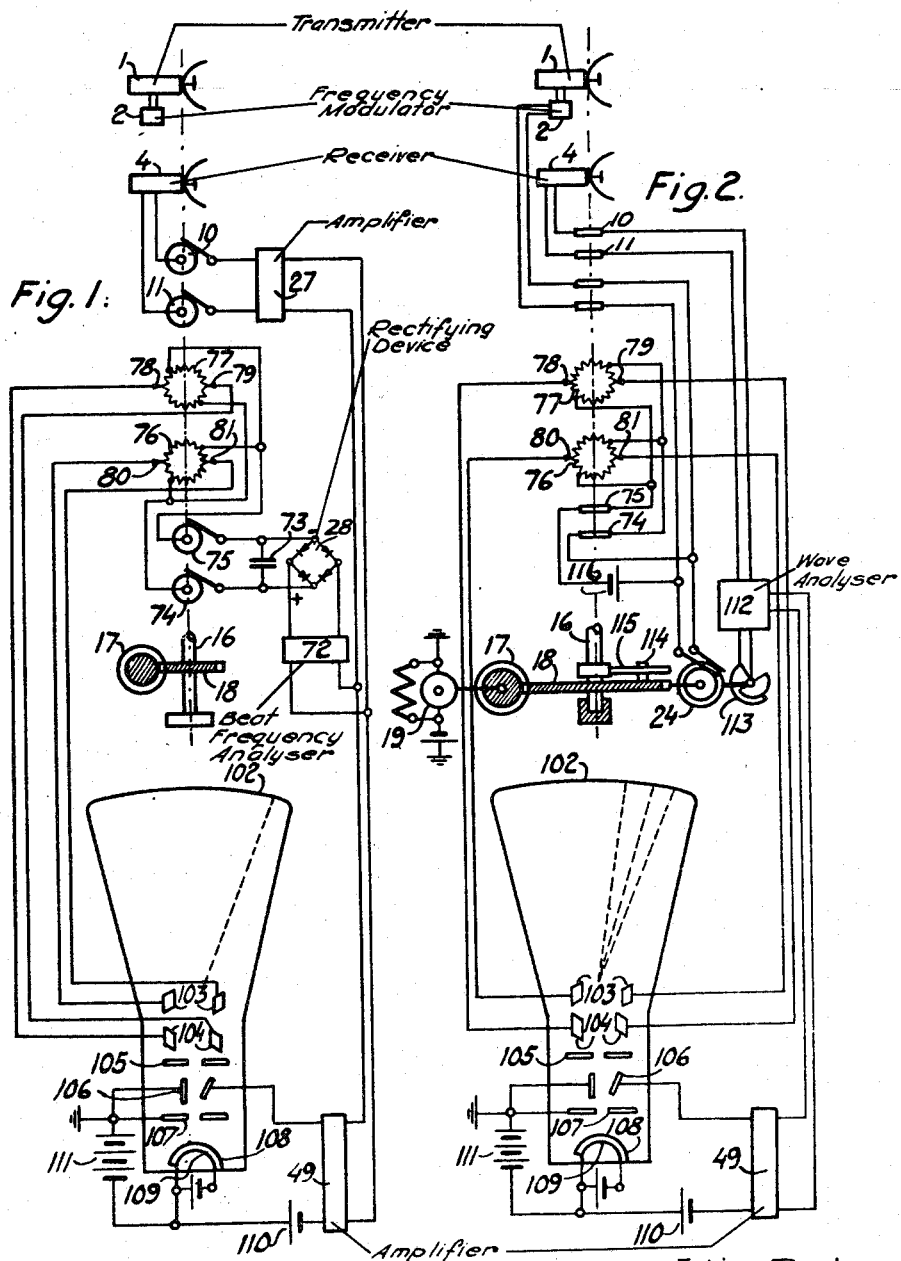

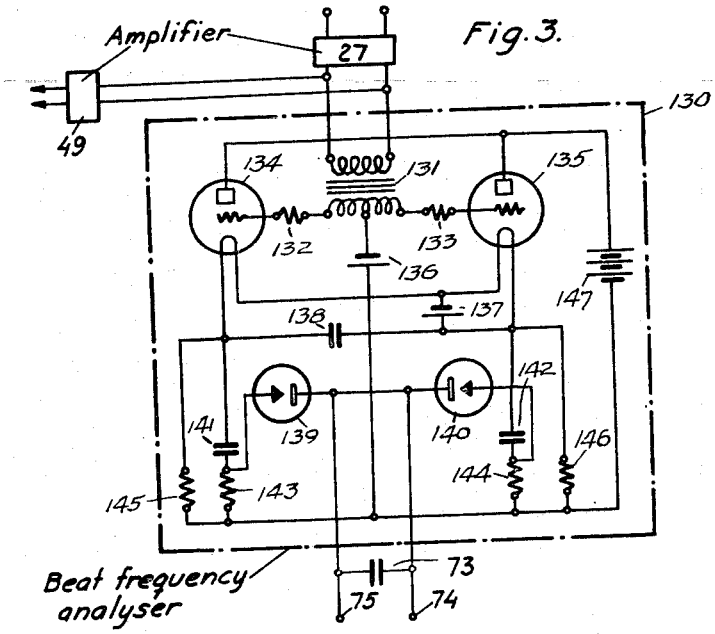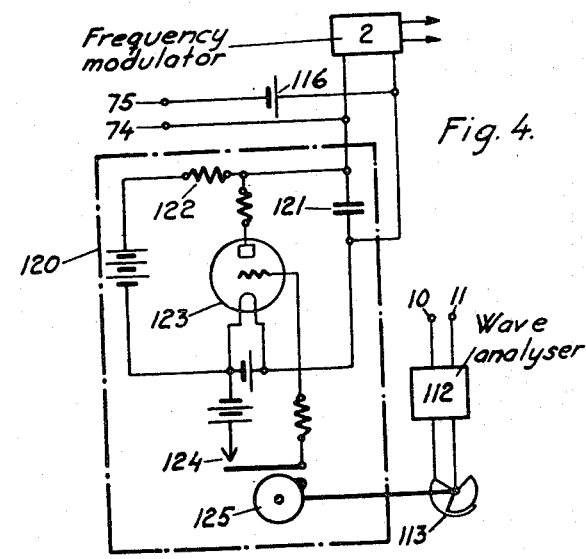

2,536,770

UNITED STATES PATENT OFFICE 2,536,770

SYSTEM AND MEANS FOR DETERMINATION OF DIRECTION AND DISTANCE

Helge Fabian Rost, Djursholm, and Per Harry Elias Claesson, Jakobsberg, Sweden

Application October 9, 1940, Serial No. 360,362
In Great Britain October 16, 1939

13 Claims. (Cl. 343—10)

The present invention relates generally to the art of measuring distances and indicating directions of objects, for instance obstacles, from a movable or stationary observation point.

The invention is particularly useful for sea and air craft, although it also has many uses on land.

The invention is greatly needed in mist and fogs, when smoke screens have been laid, at night, and generally when sight is impeded and the obstructing objects cannot be seen. The device according to the present invention indicates the position of hidden and obscured objects such as for instance fog covered icebergs, ships, shore lines, mountains, buildings, etc. The invention makes possible a safe sea and air traffic when sight is impeded without the necessity of reducing the speed and without any risk of collision whatsoever.

According to the present invention the exact direction and the exact distance of the hidden object from the observation station is immediately and automatically indicated and observable the same as if the object were physically visible. The saving in time of, for example, a ship at sea that does not need to stop or slow down when entering a fog belt, will be readily understood.

An object of the present invention is, to provide a single instrument, at a point of observation, which will give automatic simultaneous indications of directions and distances from said point to a number of objects in space. We accomplish these results by the use of the following devices and instrumentalities: a transmitter of frequency modulated radio waves; an automatically rotatable radio wave receiver adapted to receive waves transmitted by the transmitter and directed to receive waves reflected from said objects in order to originate beat frequencies; means of indication comprising a ray indicating screen and a ray-emitting source for the emission of rays projectable as visible lightspots on said screen; ray-controlling means comprising electrical ray deviation and baffle means adapted to radially deviate such a ray and to control its projection distance from its normal projection on said screen; beat frequency analyzing means coupled between the receiver and the ray-controlling means, said beat-frequency analyzing means being adapted to allow potentials depending on the beat frequencies to pass to said ray-controlling means; and synchronizing means mechanically coupled to movable parts of the receiver and electrically coupled to the said ray controlling means for turning the ray synchronously with the directed receiver, whereby the ray controlling means is operable by means of the synchronizing means and by the potentials from the frequency analyzing means. As a result, the ray is deviable and projectable on the screen in the direction of an object and at a distance from the normal position of the ray, depending upon the beat frequency proportional to the distance from said object.

According to a feature of the invention simultaneous measuring of direction and distance can be made by means of a beam or ray of light or an electronic ray on a stationary fluorescent screen provided with a concentric and a radial scale, whereby the distance of the ray from its normal position on said screen indicates the distance of the corresponding object from the craft. By observing the location of the beam with respect to the radial scale the direction of the scanned object is directly given with respect to the course of the craft.

According to another feature of the invention several objects, for example, crafts and mountain ranges stepwise located one behind another on the same line can be observed and registered individually on the said fluorescent screen.

The transmitter and the receiver can be mounted upon the craft on the same vertical shaft at a suitable height with free sight forward and to the sides. The said shaft can rotate or intermittently move from one side to the other so that the desired region can be conveniently scanned. If a ship should be exposed to heavy rolling so that a vertical position of the craft cannot be maintained, a known mechanical compensating device can be used similar to that used for maintaining a light house on board a ship in vertical position.

The direction of the scanned objects with respect to the course of the craft is obtained according to this invention by means of a directional indicating device associated with the rotating shaft carrying the receiving and detecting means or with a shaft rotating synchronously with the said former shaft.

Our invention will be further understood from the following description when read in connection with the accompany drawings of which:

Fig. 1 diagrammatically shows one embodiment of the invention according to which the direction and distance of the scanned objects are directly indicated on the fluorescent screen of a cathode ray tube, whereby a cathode ray is moved synchronically with the scanning of the receiver.

Fig. 2 diagrammatically shows another embodiment of the invention according to which direction and distance of a plurality of objects, for example one behind another, can be directly observed on the fluorescent screen of a cathode ray tube.

Fig. 3 shows a preferred circuit of a beat frequency amplitude correcting and analysing means to be connected instead of beat frequency analyser 72 and rectifying device 28 shown in Fig. 1.

Fig. 4 is a simplified diagram of a "kipp"-generator circuit to be used instead of alternator 24 of Fig. 2.

In Fig. 1, I represents a radio transmitter, of ultrashort or micro waves with preferably velocity modulated tubes, for example a Klystron or a rhumbatronas oscillator and amplifier. 2 is a frequency modulator. Frequency modulation can be made, for example, by varying the anode voltage of the transmitting tube. 4 is a receiving device of reflected waves. Both transmitter and receiving device are shown with reflectors for sharp directional transmission and reception. 10 and 11 are collector rings fixed on the rotating shaft 16 on which shaft the transmitter 1 and detector 4 with reflectors are also mounted. The shaft 16 is turned by a motor (not shown) and worm gear 17—18. 27 is a constant volume amplifier for the received waves. 28 is a rectifying device. 72 is a net work of a beat frequency analyser, for example, condensers of variable impedance for variable beat frequencies to allow more current to pass for high beat frequencies than for low ones so as to cause greater deflection of cathode rays of cathode ray tube 102 for high beat frequencies than for low ones. 28 is a rectifying device to change the received beat frequency to direct current. 73 is a condenser to smoothen out the rectified current. 74 and 75 are collector rings to conduct the rectified current to circular potentiometers 76 and 77 on shaft 16 and provided with contact brushes 80—81 and 78—79 respectively. The leads from collector rings 74 and 75 are connected to both potentiometers 76 and 77 on each circular resistance wire at diametrically opposite sides, the diameter through connection points of one potentiometer being at right angles to the corresponding connection points of the other potentiometer.

Cathode ray oscillograph 102 is provided with a fluorescent screen. 103 and 104 are deflecting plates at right angles to each other; 105 is a beam trap diaphragm. 106 are beam or ray trap plates for deviation of the ray when no beat frequency is received to make the ray invisible on the screen. 107 is the anode. 108 is the cathode. 109 is the filament. 110 is a current source to supply negative potential to the beam trap plates to cause the beam to strike the diaphragm 105 instead of proceeding along the axis through the said diaphragm. 111 is the anode current source.

The operation of the device shown in Fig. 1 takes place in the following way. The modulated waves transmitted by transmitter 1 are received in part directly and in part reflected from an eventual obstacle by the beat-detecting receiver 4. The transmitter and receiver are given a rotating or a back and forth motion on vertical shaft 16. After the received beat frequency has been amplified in amplifier 27 the current is divided into two paths. One part of the beat frequency current is thus directed via amplifier 49, which eventually is provided with a rectifier, to the beam trap plates 106 of cathode ray oscillograph 102, while the other part of the beat frequency current is directed through a net work 72 whereby the current from said network will be varied, as before described, in accordance with the beat frequencies generated. To obtain a constant voltage in amplifier 27 a circuit can be used as described in an article titled "The application of constant volume amplifier to a short wave single side band transatlantic radio circuit," published in Post Office Electrical Engineers Journal, London, vol. 31, July 1938; or in an article titled "A volume limiting amplifier" published in Bell Laboratories Record, New York, Jan. 1928, p. 179. The current through rectifying device 28 depends on the beat frequency so that indication of varying frequencies can be made accordingly. As it is generally difficult to construct an amplifier 27 of absolutely constant output volume, due to the great variations of beat frequencies received on the input side, said difficulty can partly be eliminated by arranging the amplifier in known way to amplify the high beat frequencies originated from weak radio waves reflected from distant objects more than the low beat frequencies originated from strong radio waves reflected from objects located at short distance. The difficulty can further be corrected by interconnecting a beat frequency amplitude correcting, rectifying and analyzing means instead of net work 72 and rectifying device 28, which analyzing means is similar to a circuit arrangement shown in an article entitled "A direct reading frequency meter suitable for high speed recording," published in "Review of Scientific Instruments," official publication of American Institute of Physics, February, 1935, vol. 6, page 43. Instead of connecting the output of the circuit shown in said article to an amperemeter, we connect the output of said circuit to collectors 74 and 75 parallel to the condenser 73 as shown in Fig. 3.

In Fig. 3 the beat frequency amplitude correcting, rectifying and analyzing means 130 represents net work 72 and rectifying device 28 of Fig. 1. The circuit shown is a modification of a two-bulb thyratron rectifier which comprises the thyratrons 134 and 135, the condenser 138 and the resistances 132 and 133. Resistances 143—146 and condensers 141—142 are used in supplementary circuits. The circuit operates in the following way:

Supposing that the thyratron 135 is not operated and that the thyratron 134 receives the normal plate current, the condenser 141, connected to thyratron 134, and the condenser 138 are each charged with a certain potential E, while the condenser 142 remains uncharged. When the received beat frequency through the transformer 131, which has a center tap on its secondary winding, is varying in such a way that the grid of thyratron 135 has received sufficient positive potential, thyratron 135 begins to operate and the voltage on the cathode of thyratron 135 increases suddenly to a value E, equal to the plate potential less the potential drop in the thyratron 135. As the potential E over the condenser 138 cannot immediately change, the cathode of thyratron 134 will momentarily be positive with respect to its plate with a potential equal to E less the potential drop in thyratron 134. As the grid of thyratron 134 at the same time is negative with respect to the cathode, thyratron 134 will stop operating, provided that the ionizing time of the thyratron is not greater than the time needed for condenser 138 to be discharged through resistances 145 and 146.

In a similar way, because the available potential over condensers 141 and 142 cannot immediately change, both plates of the double-diode 139—140 will momentarily receive a positive potential E and a current impulse will be transmitted to the accumulating condenser 73 and to the indicating means connected to the contacts 74—75.

If the time constant of the measuring circuits 141—143 and 142—144 is made somewhat less than that for the transforming circuit 145—138—146, the current impulse to be transmitted to the measuring or indicating means will always be terminated within the time needed to make the thyratron 134 inoperative. With suitable values of resistances and condensers, the whole operation can be terminated in less than 50 micro-seconds and the circuit is ready for the following half-cycle.

If the output voltage from said beat frequency amplitude correcting and analyzing means should be insufficient to cause satisfactory deflection of the electron beam through deflecting plates deflecting plates 103—104, an extra amplifier can, of course be inserted in the circuit.

After passing the rectifying device 28 the current is passed through rotating potentiometers 76 and 77 which rotate synchronously with the transmitter and the receiver. The said potentiometers are connected by means of brushes 78—79 and 80—81 to deflecting plates 103 and 104 of the cathode ray oscillograph 102. By this arrangement of the rotating potentiometers it is obtained that the cathode ray of the oscillograph will always show the exact direction of the reflecting obstacle on the fluorescent screen. At the same time the degree of the deflection of the beam will simultaneously indicate the distance of the obstacle in view of the fact that the magnitude of the rectified current of the beat frequency is proportional to the said frequency which in its turn is proportional to the time that the transmitted and reflected wave takes to travel from the transmitter to the object and back again.

The part of the beat frequency current that is passed through the amplifier 49 serves only to neutralise the normal negative voltage on beam trap 106 so as to straighten the cathode ray so as to make the same pass through the hole of the beam trap diaphragm 105. If desired, the beam trap 106 and amplifier 49 can be omitted in which case the cathode beam will be visible in its normal position on the fluorescent screen.

If the obstacle, for example the coast, consists of various ranges of obstacles such as mountains of different heights one behind the other so that the frequency registering instrument receives several beat frequencies simultaneously, the device shown in Fig. 1 will show the average distance to said various obstacles.

If, however, indication is desired of a plurality of beat frequencies individually, an arrangement as that shown in Fig. 2 has to be resorted to.

Fig. 2 is similar to Fig. 1. However, the device according to Fig. 2 differs from that shown in Fig. 1, in the following respects: instead of providing a continuously rotating motion as shown in Fig. 1 a rotating back and forth movement is performed in the device according to Fig. 2. Instead of using a single beat frequency amplifier, as illustrated in Fig. 1, the device shown in Fig. 2 is provided with a wave analyser 112—113, by means of which it is possible to measure the distance to several objects one behind another. Element 113 is a rotating condenser of special shape. Condenser 113 is associated with wave analyzer 112. In order to impart to shaft 16 a reciprocating movement, a pin 114 is attached to gear 18 which is driven by worm 17. The latter is actuated by motor 19. Arm 115 is attached to shaft 16. Arm 115 is provided with a slot in which pin 114 slides back and forth during rotation of gear 18. As a result, arm 115 and shaft 16 are given a reciprocating motion through a certain predetermined angle. The motor 19 is driving a single phase converter, the current obtained being taken from collector rings 24 for frequency modulating purposes of the transmitted wave in transmitter 1. Frequency modulation is hereby obtained, in known way, for example, by varying the anode voltage of the transmitting tube. 116 is a direct current source. The same single phase current, for example 50 cycles is also used for continually moving the light beam in radial straight lines on the fluorescent screen 102 from its normal position to the edge all through the scanning angle through which the transmitter and the receiver are moved. This scanning movement of the light beam of the cathode ray oscillograph is accomplished by the rotating potentiometers 76 and 77 previously described. On account of the beam trap 106 the real movement of the beam is not seen on the screen. Only when the transmitted radio beam strikes an object or an obstacle and a reflected wave is received the cathode ray beam is allowed to pass the beam trap. The wave analyzer 112 operates in known way as an amplifier for a certain beat frequency in accordance with the momentary position of the variable condenser 113. The output voltage of the wave analyzer 112 operates the beam trap 106, if desired, via the amplifier 49 at the moment when a reflected wave is received. The voltage from collector rings 24 will accordingly vary the potential of the deflecting plates 103 and 104 at the same time as the said voltage supplies substantially linear frequency modulation potential to the frequency modulator 2.

An interdependence is obtained in the following way between the tuning of the wave analyzer and the voltage from collector rings 24. The wave analyzer is tuned to the lowest beat frequency to be received when the potential of the deflecting plates 103—104 is, for example, zero volts, in which case the electron beam is located in its normal position. When the tuning of the wave analyzer and the voltage from collector rings 24 are synchronously varied, the electron beam will move from its normal position towards the circumference of the screen 102. This takes place in such a way that every position of the electron beam corresponds to a certain tuning of the wave analyzer. The wave analyzer will thus test if there is such a beat frequency that exactly corresponds to the momentary position of the electron beam. If there exists such a beat frequency at said moment, the wave analyzer will deliver at its output side a potential that in the previously described way operates the beam trap thereby making the electron beam visible as a light spot on the said screen at a distance from its normal position that corresponds to the distance of the object.

In this manner the exact position with respect to distance and direction is clearly shown on the fluorescent screen in the instant when the radio beam sweeps past the said objects. If the rotation of shaft 16 or the sweeping back and forth movement is made rapid enough the spot can be seen every time the radio beam strikes the obstacle, and if the fluorescent screen is of sufficient delay or after-glow a steady light signal will indicate the position of a moving ship, iceberg, or the whole shore line with inland mountain ranges will show up as a map on the fluorescent screen.

This very desirable feature of the invention is accomplished by means of the wave analyser 112—113 (described in "Wireless Engineer," published by Iliffe & Son Ltd., Dorset House, Stanford St., London S. E. 1, 1937, page 75, in combination with the particular arrangement of parts as shown in our Fig. 2).

A linear "kipp"-generator can be used for the direction of the cathode ray beam from center of fluorescent screen 102 to the edge of said screen instead of the voltage variation caused by alternating current from collector rings 24, shown in Fig. 2.

The connection of said "kipp"-generator to other elements of Fig. 2 is diagrammatically shown in Fig. 4, in which 120 is a simplified diagram of a Kipp-generator of known construction, whereby charges and discharges of the condenser 121 takes place with a velocity depending upon the size of the condenser 121 and of the resistance 122. The discharge takes place rapidly when the gasfilled tube 123 is lighted at a certain critical voltage and the condenser 121 becomes short-circuited.

The synchronizing between the wave analyser 112—113 of Fig. 2 and the Kipp-generator can be made, for example, by means of contacts 124 and cam wheel 125, which upon closing of contacts 124 causes the tube 123 to oscillate. This closing of contacts is arranged to take place when the wave analyser is in position to receive the lowest possible beat frequency.

The beat frequency in the frequency modulating system is dependent on the distance to the object, or the extent of the frequency modulation and on the number of frequency modulating sweeps per second.

The deflection of the cathode rays can, of course, be made by means of coils instead of by condenser plates 103 and 104. In such a case the deflection operation can be made with low voltage and high current.

The invention is not intended to be limited to the figures described which show only a few embodiments of the invention. It should be clear that the general inventive idea of simultaneous visual indication of direction and distance of hidden objects at a certain point of observation by means of a transmitted wave which is reflected by such object is not limited to scanning in a horizontal direction as illustrated. The inventive idea can also be used in a vertical direction or in combined horizontal and vertical scanning directions in order to increase the scanning view.

We claim:

1. In a system for the automatic, simultaneous indication on a single instrument at a place of observation of directions and distances from said place to a number of objects in space, a transmitter of frequency modulated radio waves, an automatically rotatable radio wave receiver adapted to receive waves transmitted by the transmitter and directed to receive waves reflected from said objects in order to originate beat frequencies, beat frequency analyzing means connected to the receiver, means of indication comprising a ray-emitting source, electrical deviation means including a potential generating source to radially deviate rays from said source from their normal position and a ray indicating screen on which said rays are projectable as visible light-spots, said means of indication being connected to said analyzing means, and synchronizing means connected to said deviation means to turn said rays synchronously with the movements of said directed receiver, whereby the radial deviation projection distance of a ray in the direction of an object on said screen is controllable by a voltage originated from the beat frequency current and which allows said ray to project a light spot on said screen in the direction and proportional to the distance of the respective object in the moment that a reflected wave is received from said object.

2. The system claimed in claim 1, in which the said means of indication is a cathode ray oscillograph provided with a flourescent screen.

3. The system claimed in claim 1, in which the analyzing means is a wave analyzer adapted to successively respond to and register a plurality of beat frequencies obtained from reflection of a transmitted wave against objects located at a plurality of distances from said place.

4. The system claimed in claim 1, in which the means of indication comprises an electrical trap and a negative potential source in series with said beat frequency analyzing means to normally bar the passing of rays to said screen, but to allow the passing of rays upon receipt of a reflected wave.

5. The system claimed in claim 1, in which the transmitter is coupled to the receiver and adapted to automatically rotate in synchronism with the same, the transmitter and the receiver being provided with reflectors pointing in the same direction for sharp directional transmission and reception.

6. The system claimed in claim 1, in which the transmitter and the receiver are rotatable in any desired plane of space, the transmitter being coupled to the receiver and adapted to automatically rotate in synchronism with the same, the transmitter and the receiver being provided with reflectors pointing in the same direction for sharp directional transmission and reception in space.

7. The system claimed in claim 1, in which a Kipp-generator of variable linear frequency character is coupled to the transmitter to transmitt frequency modulated waves, said Kipp-generator also being coupled to said synchronizing means to radially deviate rays from said ray-emitting source and coupled to the said beat frequency analyzing means, which is adapted to emit synchronizing impulses to the Kipp-generator for the operation of same in step with the successive tuning of said beat frequency analyzing means, whereby a synchronizing impulse is emittable from the said beat frequency analyzing means to the Kipp-generator when the former one has been tuned to receive the highest beat frequency corresponding to the greatest distance to the object, and when the Kipp-generator is in position to emit the highest potential corresponding to the greatest deviation of the said ray.

8. The system claimed in claim 1, in which the said synchronizing means comprise circular potentiometers and contact brushes concentrically arranged around a shaft moved synchronously with the receiver, said potentiometers being connected to said potential source to radially deviate said rays from their normal position.

9. The system claimed in claim 1, in which the potential generating source coupled to the ray deviating means comprises a beat frequency amplitude correcting and rectifying device forming part of said analyzing means and connected to the said synchronizing means.

10. The system claimed in claim 1, in which the beat frequency analyzing means comprises rectifying means to deliver a voltage substantially proportional to the received frequency and independent of the input volume.

11. In a system for the automatic, simultaneous indication on a single instrument at a place of observation of directions and distances from said place to a number of objects in space, a transmitter of frequency modulated radio waves, an automatically rotatable radio wave receiver adapted to receive waves transmitted by the transmitter and directed to receive waves reflected from said objects in order to originate beat frequencies, means of indication comprising a ray indicating screen and a ray-emitting source for the emission of rays projectable as visible light spots on said screen, ray-controlling means comprising electrical ray-deviation and baffle means adapted to radially deviate such a ray and control its projection distance from its normal position on said screen, beat frequency analyzing means coupled between the receiver and the ray-controlling means, said beat frequency analyzing means adapted to allow potentials depending on the beat frequencies to pass to said ray-controlling means, and synchronizing means mechanically coupled to movable parts of the receiver and electrically coupled to the said ray-controlling means for turning the ray synchronously with the directed receiver, whereby the ray-controlling means is operable by means of the synchronizing means and by potentials from the frequency analyzing means so that the ray is deviable and projectable on the screen in the direction of an object and at a distance from the normal position of the ray depending upon the beat frequency proportional to the distance to the said object.

12. A radio object detecting system comprising a source of frequency modulated radio frequency energy, means for directively radiating said energy in the form of a beam, means for causing said beam to scan a region proximate to said system in a cyclic manner, means for receiving the beam energy reflected by an object upon which it impinges, and for directly deriving energy from said radiating means and combining it with said reflected energy, means for frequency analyzing the said combined energies, and means including a cathode ray tube connected to the scanning means and to the frequency analyzing means and jointly controlled for producing a visual signal which indicates simultaneously the direction and the distance of the reflecting object.

13. Apparatus for indicating the distances and angular bearings of bodies from an origin in space comprising means to transmit signal waves of varying frequency from the origin, means at the origin to receive echoes of said transmitted waves reflected from a distant body, at least one of said means being directional and rotatable about a given axis at said origin, means for producing rotation of said rotatable means about said axis, means for combining said received waves with waves transmitted from the origin to produce a beat wave of a frequency proportional to the distance to said reflecting body from said origin, an indicator having a circular indicating area, and means controlled by said received beat wave for producing a localized indication within said area, said indication producing means including means for rotating the angular position of said localized indication about the center of said area and in synchronism with the rotation of said rotatable means together with frequency sensitive means controlled by said beat wave for fixing the radial distance of said localized indication from the center of said indicating area in accordance with the frequency of said beat wave.

HELGE ROST.
HARRY CLAESSON.

REFERENCES CITED

The following references are of record in the file of this patent:

UNITED STATES PATENTS

| Number | Name | Date |
|---|---|---|
| 2,151,323 | Hollmann | Mar. 21, 1939 |
| 2,193,361 | Rice | Mar. 12, 1940 |

FOREIGN PATENTS

| Number | Country | Date |
|---|---|---|
| 497,147 | Great Britain | Dec. 9, 1938 |